US009762465B2

(12) United States Patent
Kim et al.

(10) Patent No.: US 9,762,465 B2
(45) Date of Patent: Sep. 12, 2017

(54) METHOD AND APPARATUS FOR TRANSMITTING A RESPONSE TO A COMMAND IN WIRELESS COMMUNICATION SYSTEM

(71) Applicant: LG ELECTRONICS INC., Seoul (KR)

(72) Inventors: Seongyun Kim, Anyang-si (KR); Seungkyu Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 241 days.

(21) Appl. No.: 14/416,517

(22) PCT Filed: Aug. 20, 2013

(86) PCT No.: PCT/KR2013/007455
§ 371 (c)(1),
(2) Date: Jan. 22, 2015

(87) PCT Pub. No.: WO2014/030905
PCT Pub. Date: Feb. 27, 2014

(65) Prior Publication Data
US 2015/0188790 A1    Jul. 2, 2015

Related U.S. Application Data

(60) Provisional application No. 61/691,239, filed on Aug. 20, 2012, provisional application No. 61/693,334, filed on Aug. 27, 2012.

(51) Int. Cl.
*G06F 15/16* (2006.01)
*H04L 12/26* (2006.01)
(Continued)

(52) U.S. Cl.
CPC ........... *H04L 43/08* (2013.01); *G06F 1/3228* (2013.01); *H04L 29/08135* (2013.01);
(Continued)

(58) Field of Classification Search
CPC ............. H04L 29/08135; G06F 1/3228; G06F 9/54–9/542; G06F 9/547
See application file for complete search history.

(56) References Cited

U.S. PATENT DOCUMENTS 6,088,740 A * 7/2000 Ghaffari ............... G06F 9/3879
710/112
6,148,323 A * 11/2000 Whitner ............... G06F 11/28
714/E11.178
(Continued)

FOREIGN PATENT DOCUMENTS

KR  10-2009-0086447 A  8/2009
KR  10-2011-0039860 A  4/2011
WO  WO 2009/056148 A2  5/2009

*Primary Examiner* — Brendan Higa
(74) *Attorney, Agent, or Firm* — Birch, Stewart, Kolasch & Birch, LLP

(57) ABSTRACT

A method for transmitting a response to a command from a server in a wireless communication system, according to one embodiment of the present invention, is implemented by a terminal, and comprises the steps of: receiving a command from a server; implementing the command until a timeout expires; transmitting to the server, a first response including an identifier for the command if the implementation of the command is not completed until the timeout expires; and transmitting a second response including the result of the command and the identifier after the implementation of the command is completed.

14 Claims, 6 Drawing Sheets

(51) Int. Cl.
*H04L 29/08* (2006.01)
*G06F 1/32* (2006.01)
*H04W 88/18* (2009.01)
*H04W 24/08* (2009.01)
*H04L 12/24* (2006.01)

(52) U.S. Cl.
CPC .......... *H04L 41/0813* (2013.01); *H04L 43/04* (2013.01); *H04W 24/08* (2013.01); *H04W 88/18* (2013.01)

(56) References Cited

U.S. PATENT DOCUMENTS

| | | | |
|---|---|---|---|
| 7,058,704 B1* | 6/2006 | Mangipudi | H04L 41/5009 370/235 |
| 7,797,368 B1* | 9/2010 | Gadkari | G06F 9/5066 709/201 |
| 8,171,475 B2* | 5/2012 | Kajita | G06F 9/45512 709/201 |
| 2002/0023122 A1* | 2/2002 | Polizzi | G06F 17/30873 709/202 |
| 2005/0198638 A1* | 9/2005 | Bai | G06F 11/2069 718/100 |
| 2006/0095582 A1* | 5/2006 | Nitya | H04W 28/065 709/236 |
| 2007/0083647 A1 | 4/2007 | Frost et al. | |
| 2009/0222813 A1* | 9/2009 | Johnson | G06F 8/60 717/174 |
| 2009/0265471 A1 | 10/2009 | Li et al. | |
| 2010/0131916 A1* | 5/2010 | Prigge | G06F 8/10 717/104 |
| 2010/0199333 A1 | 8/2010 | Keum et al. | |
| 2011/0125889 A1* | 5/2011 | Tsao | H04L 67/1097 709/223 |
| 2014/0181825 A1* | 6/2014 | He | G06F 9/5027 718/102 |
| 2015/0277942 A1* | 10/2015 | Rork | G06F 8/65 701/31.4 |

* cited by examiner

FIG. 1
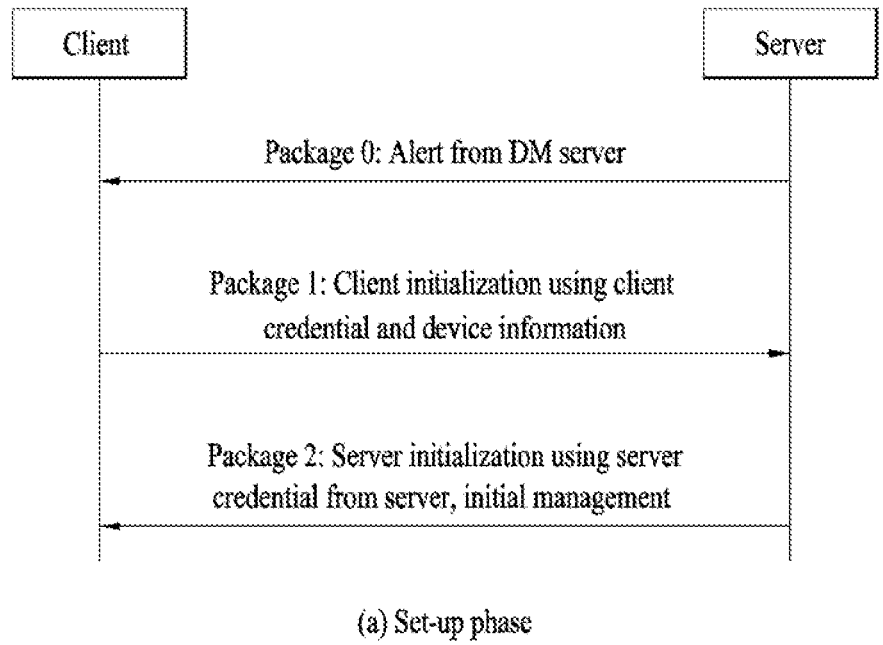
(a) Set-up phase
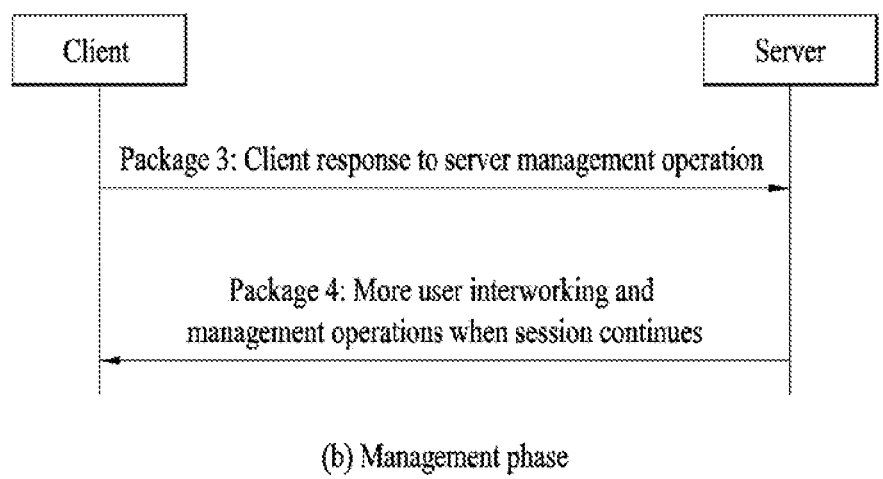
(b) Management phase

METHOD AND APPARATUS FOR TRANSMITTING A RESPONSE TO A COMMAND IN WIRELESS COMMUNICATION SYSTEM

CROSS REFERENCE TO RELATED APPLICATIONS

This application is the National Phase of PCT International Application No. PCT/KR2013/007455, filed on Aug. 20, 2013, which claims priority under 35 U.S.C. 119(e) to U.S. Provisional Application Nos. 61/691,239, filed on Aug. 20, 2012 and 61/693,334, filed on Aug. 27, 2012, all of which are hereby expressly incorporated by reference into the present application.

TECHNICAL FIELD

The present invention relates to a method for transmitting a response to a command in a wireless communication system and an apparatus for the same.

BACKGROUND ART

In DM 1.3, a DM client (DMC) notifies a DM server (DMS) of a command execution result through a synchronization or asynchronization response (or report) mode when the DMC performs an execution command. The DMC selects one of the two modes. To enable the DMC to transmit an asynchronization response, the DMS needs to send an identifier of a command when transmitting the command. When the DMS does not transmit the identifier of the command, the DMC cannot transmit an asynchronization response to the command. That is, it is possible to notify the DMC that the DMC can reply to a specific execution command through an asynchronization response by sending the identifier of the command in DM 1.3. However, a standard of selecting one of the two response modes cannot be provided to the DMC and thus the DMC needs to autonomously select the synchronization or asynchronization response mode and reply to a command in the selected response mode.

DISCLOSURE

Technical Problem

An object of the present invention devised to solve the problem lies in a method for efficiently transmitting a response to a command from a server in a wireless communication system.

The technical problems solved by the present invention are not limited to the above technical problems and those skilled in the art may understand other technical problems from the following description.

Technical Solution

In an aspect of the present invention, a method for transmitting, by a terminal, a response to a command from a server in a wireless communication system includes: receiving a command from the server; executing the command until a timeout expires; transmitting, to the server, a first response including an identifier for the command when execution of the command is not completed before the timeout expires; and transmitting a second response including a result of the command and the identifier after completion of execution of the command.

Preferably, the timeout may be a predetermined value or a value transmitted from the server.

Preferably, the timeout may be determined as a predetermined value when the timeout is not explicitly received from the server.

Preferably, the timeout may be determined as a predetermined value when a timeout having a specific value is explicitly received from the server.

Preferably, the method may further include generating the identifier for the command.

Preferably, the identifier for the command may be a value valid between a time when the first response is transmitted and a time when the second response is transmitted.

In an aspect of the present invention, a method for transmitting, by a terminal, a response to a command from a server in a wireless communication system includes: receiving a command package including a plurality of commands from the server; executing the commands in the command package until a timeout expires; transmitting, to the server, a first response including results of commands of which execution has been completed, from among the commands in the command package, and identifiers for remaining commands of which execution has not been completed when execution of all commands in the command package is not completed until the timeout expires; and transmitting a second response including results of the remaining commands and the identifiers after completion of execution of the remaining commands.

Preferably, the timeout may be a predetermined value or a value transmitted from the server.

Preferably, the timeout may be determined as a predetermined value when the timeout is not explicitly received from the server.

Preferably, the timeout may be determined as a predetermined value when a timeout having a specific value is explicitly received from the server.

Preferably, the method may further include generating the identifiers for the commands.

Preferably, the identifiers for the commands may be values valid between a time when the first response is transmitted and a time when the second response is transmitted.

In an aspect of the present invention, a method for transmitting, by a terminal, a response to a command from a server in a wireless communication system includes: receiving a command package including a plurality of commands from the server; sequentially executing the commands in the command package until a timeout expires, including results of commands of which execution has been completed in a first response before expiration of the timeout, and including identifiers for remaining commands of which execution has not been completed in the first response before expiration of the timeout; transmitting the first response to the server when a command to be initiated to execute is not present in the command package; and transmitting a second response including results of the remaining commands and identifiers for the remaining commands after completion of execution of the remaining commands.

In an aspect of the present invention, a terminal configured to transmit a response to a command from a server in a wireless communication system includes: a radio frequency (RF) unit; and a processor configured to control the RF unit, wherein the processor is configured to receive a command from the server, to execute the command until a timeout expires, to transmit, to the server, a first response including an identifier for the command when execution of the command is not completed before the timeout expires and to transmit a second response including a result of the command and the identifier after completion of execution of the command.

In an aspect of the present invention, a terminal configured to transmit a response to a command from a server in a wireless communication system includes: an RF unit; and a processor configured to control the RF unit, wherein the processor is configured to receive a command package including a plurality of commands from the server, to execute the commands in the command package until a timeout expires, to transmit, to the server, a first response including results of commands of which execution has been completed, from among the commands in the command package, and identifiers for remaining commands of which execution has not been completed when execution of all commands in the command package is not completed until the timeout expires, and to transmit a second response including results of the remaining commands and the identifiers after completion of execution of the remaining commands.

In an aspect of the present invention, a terminal configured to transmit a response to a command from a server in a wireless communication system includes: an RF unit; and a processor configured to control the RF unit, wherein the processor is configured to receive a command package including a plurality of commands from the server, to sequentially execute the commands in the command package until a timeout expires, to include results of commands of which execution has been completed before expiration of the timeout in a response, to include identifiers for remaining commands of which execution has not been completed before expiration of the timeout in the response, and to transmit the response to the server when a command to be initiated to execute is not present in the command package.

The aforementioned technical solutions are merely parts of embodiments of the present invention and various embodiments in which the technical features of the present invention are reflected can be derived and understood by a person skilled in the art on the basis of the following detailed description of the present invention.

Advantageous Effects

According to an embodiment of the present invention, it is possible to efficiently transmit a response to a command from a server in a wireless communication system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 1 illustrates a conventional procedure associated with command packages;

BEST MODE

Figure 2:
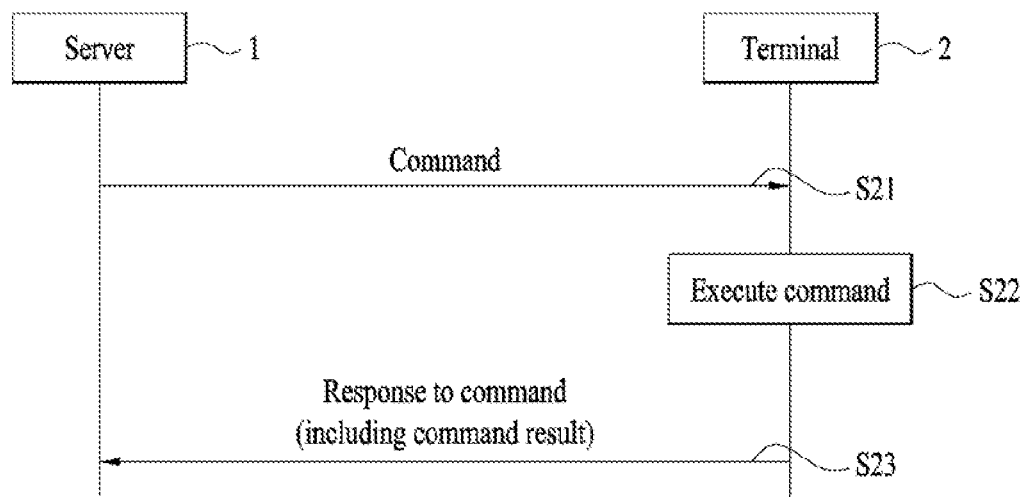
FIG. 2 illustrates a procedure for transmitting a command and replying to the command according to an embodiment of the present invention.

Reference will now be made in detail to the preferred embodiments of the present invention, examples of which are illustrated in the accompanying drawings. The following detailed description of the invention includes details to aid in full understanding of the present invention. Those skilled in the art will appreciate that the present invention can be implemented without these details.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

In the present invention, devices for device-to-device communication, that is, M2M devices, may be fixed or mobile and include devices which communicate with a server for device-to-device communication, that is, an M2M server to transmit/receive user data and/or various types of control information. The M2M devices may be referred to as terminal equipment, mobile stations (MSs), mobile terminals (MTs), user terminals (UTs), subscriber stations (SSs), wireless devices, personal digital assistants (PDA), wireless modems, handheld devices and the like. In the present invention, the M2M server refers to a fixed station which communicates with M2M devices and/or other M2M servers, and exchanges various types of data and control information with M2M devices and/or other M2M servers by communicating with the M2M devices and/or other M2M servers.

A description will be given of the background associated with the present invention.

Device Management

Device management (DM) refers to management of device configuration and other managed objects of devices from the point of view of various management authorities. Device management includes subsequent updates of persistent information in devices, retrieval of management information from devices and processing events and alarms generated by devices, but is not restricted to setting initial configuration information in devices.

Management Tree

Management tree is an interface by which a management server interacts with a DM client, e.g. by storing values in the management tree or retrieving values therefrom and by manipulating the properties of the management tree, for example, access control lists (ACLs). In the specification, the management tree may be used interchangeably with a device management tree or DM tree.

Management Object (MO)

A management object is a subtree of the management tree which is intended to be a (possibly singleton) collection of nodes which are related in some ways. For example, ./DevInfo Node and child nodes thereof can form a management object. A simple management object may consist of a single node.

DM Server or DMS (Device Management Server)

A DM server or DMS may be an abstract software component in a deployed device management infrastructure that conforms to OMA device management enabler static conformance requirements specified for the DM servers or DMS. The DM server or DMS can serve as an end-point of DM client-server protocols and DM server-server Interface.

Further, the DM server or DMS may be set in an apparatus, device, computer and the like, which include a communication module, processor module and the like, and thus the DM server or DMS can be implemented as one device.

DM Client or DMC (Device Management Client)

A DM client or DMC may be an abstract software component in a device implementation that conforms to the OMA device management enabler static conformance requirements specified for DM clients. The DM client or DMC can serve as an end-point of the DM client-server protocols.

Further, the DM client or DMC may be set in a device including a communication module, processor module and the like, which is a target of DM, and thus the DM client or DMC can be implemented as one device.

Access Control List (ACL)

An ACL is a list of DM server identifiers for a specific node in a management tree and access rights associated with each identifier.

Node

A Node is a single element in a management tree. There can be two kinds of nodes in a management tree: interior nodes and leaf nodes. The format property of a node provides information about whether the node is a leaf or an interior node.

Interior Node

An interior node may have child nodes but cannot store any value allocated thereto, that is, a node value. The format property of the interior Node is "node".

Leaf Node

A leaf node can store a node value but cannot have child nodes. The format property of the leaf Node is not "node". Accordingly, all parent nodes must be interior nodes.

Permanent Node

A permanent node is a node having DDF property scope set to "permanent". If a node is not a permanent node, the node corresponds to a dynamic node. The permanent node cannot be dynamically generated or deleted by a server Dynamic Node A dynamic node is a node having DDF property scope set to "dynamic" or having unspecified DDF property scope.

Sever Identifier

A server identifier refers to an OMA DM internal name for a DM server. A DM server is associated with a server identifier present in a device through an OMA DM account.

ACL Property and ACL Values

All terminals managed by the DM protocol have one DM tree starting with a root node and the DM protocol performs a management instruction for a terminal by operating each node of the DM tree. For example, to install downloaded software in a terminal, the software can be installed by executing a node "install" matched to the software. Each node may represent simple information such as a figure and complicated data such as picture data or log data. In addition, each node may represent one command such as "execute" or "download".

Each node has properties of providing meta information related thereto. The properties include a runtime during which the corresponding node can be used from generation of the node in a DM tree to extinction thereof. The runtime property includes ACL, format, name, size, title, TStamp, type and VerNo.

The ACL (Access Control List) is an indispensable function that both a terminal and a server need to execute in DM 1.3 protocol. The ACL specifies DM commands that a specific DM server can execute for a specific node. An unspecified DM command cannot be executed. In other words, the ACL refers to the authority permitted for a specific DM server for a specific node. In the DM protocol, the ACL is given to the server identifier of a DM server, instead of the URI and IP address of the DM server and DM server certificate. The server identifier is used as an identifier for authenticating the DM server in the DM protocol. In addition, the ACL can be provided as ACL properties and ACL values given to the ACL properties. In the specification, the ACL values can be interchangeably referred to as ACL information or information about the ACL. In the DM 1.3 protocol, all nodes have the ACL properties and nodes having the ACL properties are defined such that the nodes have empty ACL values or non-empty ACL values.

The ACL has unique properties including ACL inheritance, different from the runtime property. The ACL inheritance refers to acquisition of ACL values of a node in a DM tree from ACL values of the parent node of the node when the node in the DM tree does not have the ACL values. If the parent node does not have ACL values, then the ACL values are obtained from ACL values of the parent node of the parent node. Since the DM protocol specifies that the root node, the highest node of a DM tree, must have ACL values, the ACL values must be inherited. ACL inheritance from a parent node is performed only when ACL values are empty because ACL inheritance is carried out for total ACL values instead of for individual DM command. That is, when ACL values of a certain node specify only authority "Add", authority "get", which is not specified, is not inherited.

In the DM protocol, the root node has "Add=*&Get=*" as a basic value with respect to the ACL. Here, "*" is a wildcard and refers to an arbitrary DM server. The DM server uses the "Get" command in order to obtain an ACL value and the "Get" command with respect to "./NodeA/Node1?prop=ACL" gets ACL values of./NodeA/Node1. Further, "Replace" command is used in order to replace ACL values. That is, ACL values are replaced by executing the "Replace" command on "./NodeA/Node1?prop=ACL" to change the value to "Add=DMS1&Delete=DMS1&Get=DMS1". In the DM protocol, an individual ACL entry cannot be changed but all ACL values can be changed at once. The authority to get and correct ACL values is defined on the basis of the ACL. Authorities for the interior node and the leaf node are defined differently.

—Interior Node

If three are "Get" authority and "Replace" authority for the corresponding node, it is possible to get and replace ACL values of the corresponding node. The "Replace" authority refers to the authority to replace ACL values of all child nodes.

—Leaf Node

If there is "Replace" authority for the parent node of the corresponding node, then ACL values of the corresponding node can be replaced. To get the ACL of the corresponding node, the "Get" authority for the parent node of the corresponding node is required. When the "Replace" authority for the corresponding node is present, ACL values of the corresponding node can be replaced. To replace the ACL of the corresponding node, the "Replace" authority for the parent node of the corresponding node is needed.

The authority to replace ACL values of a node can be controlled by ACL values of the parent node of the node irrespective of whether the node is an interior node or a leaf node. When the "Replace" authority for an interior node is present, not only ACL values of the interior node but also ACL values of all child nodes can be replaced. Accordingly, if the "Replace" authority for the root node is present, then any authority can be provided for all nodes in the DM tree. However, having the "Replace" authority for a parent node does not mean having a specific authority such as "Get" for a child node of the parent node and the "Get" authority needs to be directly specified for the child node. Therefore, ACL values need to be corrected prior to execution of a command and ACL values of the corresponding child node are finally corrected through correction of ACL values of all nodes on a path to the child node. This is inconvenient and thus the DM protocol allows direct correction of ACL values of a corresponding node without correction of ACL values of intermediate nodes when the "Replace" authority for the parent or ancestor node of the corresponding node is present.

When the DM server generates a new node through "Add" command, the generated node does not have ACL values in general and thus all authorities are inherited from a parent node of the node. However, when the generated node is an interior node and the authority "Replace" is not present for the parent node, it is necessary to have the authority to manage the corresponding node by setting ACL values of the node at the same time as when the node is generated.

The syntax for representing ACL values is defined in [DM-TND] and an example of ACL values is "Get=DMS1&Replace=DMS1&Delete=DMS2". Here, DMS1 and DMS2 are server identifiers of DM servers and Get, Replace and Delete are DM commands. Accordingly, DMS1 can execute the "Get" and "Replace" commands for the corresponding node and DMS2 can execute the "Delete" command. Here, Get=DMS1, Replace=DMS1 and Delete=DMS2 are ACL-entries and represent individual command authorities of DM servers. That is, ACL values correspond to a set of ACL-entries and ACK values of each node may include at least one ACL entry.

DDF (Device Description Framework)

DDF is a specification for how to describe the management syntax and semantics for a particular device type. DDF provides information about MO of a terminal, management function and DM tree structure.

DM 1.3 Authentication

In DM 1.3, authentication is performed on the basis of the ACL. DM authentication is performed per DM command. When the DM server transmits a plurality of DM commands, a DM client (referred to as a DMC hereinafter) performs authentication prior to execution of an individual command and executes only a permitted DM command as a result of authentication.

DM Protocol Package

The DM protocol is composed of two parts: a set-up phase and a management phase. The management phase can be repeated a number of times that the DM server desires. A set of the set-up phase and the management phase is called a management session. Management sessions can be started with package #0 (trigger). The trigger is transmitted through out-of-band, which is a transport layer other than the transport layer through which the DM protocol is transmitted. A typical example is a short message service (SMS).

FIG. 1 illustrates the aforementioned two phases.

The management phase is composed of a plurality of protocol repetitions. Whether a session is continued is determined using package content transmitted from the DM server to a DM client. When the DM server transmits management operations, which require responses (statuses or results) from DM clients, through a package, a new package including responses of the DM clients to the management operations is transmitted from the DM clients to the DM server in the management phase, to thereby continue the session. New protocol repetition can be started according to the response package from the DM clients. The DM server can transmit a new management operation package and thus the DM server can initiate a desired number of new protocol repetitions.

When the package from the DM server to a DM client does not include management operations or challenge in the management phase, the DM client does not transmit a response package to the package received from the DM server and the protocol is ended. The DM server needs to transmit response packages to all client packages.

An unpredictable time may be taken to process packages. Accordingly, the DM protocol does not specify timeout between packages.

Packages are transmitted to the DM server or a DM client through a message belonging to a management session. The message has a unique identifier (MsgID) valid in the session and management commands included in the message have unique identifiers (CmdIDs) valid in the message.

When operation commands are not included in a sequence (management commands are sequentially processed) or atomic (all management commands are executed when the management commands are successfully performed and are not executed when any one thereof is not successfully performed) parent management command, the DM client and the DM server can freely select an execution order of management commands transmitted through a package. However, when the execution order is requested by the parent management command (e.g. sequence), the management commands need to be executed in the order of transmission of the commands.

The DM client must not transmit any command other than the "Replace" command including DevInfo, results and alerts to the DM server.

Generic Alert

The DM protocol defines generic alert messages for alerts generated by a DM client that can be associated with the management object (MO). When the DM client is associated with the management object, LocURI element in the source needs to identify the address of the management object.

After a client- or server-initiated management alert, the DM client can transmit a generic alert message to the DM server. The generic alert message can be transmitted from only the DM client to only the DM server. Upon reception of the generic alert message, the DM server needs to reply to the generic alert message by notifying the DM client how the DM server handles all generic alerts.

The DM client can transmit "generic alert" through a plurality of alerts or transmit "generic alerts" of various types through a plurality of item elements in "generic alert" using one alert. The DM protocol does not specify data of the generic alert message and specifies only how the DM client notifies the DM server of the type and format of the data. While the DM server needs to support a generic alert format, the DM server need not support all types of alert data. When the type and format of the data are not supported by the DM server, the DM server needs to reply through state 415 "Unsupported media Type or Format". If the DM client does not support a large object, then the alert message must not exceed the size of one message.

A selective parameter "mark" needs to include a significant level. When the parameter "mark" is omitted, a default significant level is assumed.

When the DM server has received an alert without error and can process data in the alert, the DM server needs to reply to the alert through state 200 "OK" or 202 "Accepted for processing". In other cases, the DM server needs to use one of the following error status codes 401, 406, 407, 412, 415 and 500.

—Message Structure

A basic design of the generic alert message is as follows.

Type: the type element needs to be specified and indicates the media type of content information in the data element in the meta element.

Format: the format element must be specified. The format element specifies the format of the data element following the format element. Mark: the mark element can be specified. The mark element defines the significant level of the alert message. The following levels are allowed in the generic alerts: "fatal", "critical", "minor", "warning", "informational", "harmless" and "indeterminate". The order of the levels indicates the significant level, "fatal" is most significant and "indeterminate" is least significant. If the mark element is omitted, then the default significant level "informational" is assumed.

Data (in <Item>): the data element must be specified. The data element needs to use Format and Type in Meta tag.

Correlator: this is an optional element and is used when an alert is an asynchronization response to the "Execute" command. The correlator indicates a command identifier and may be referred to as a global identifier. In general, the correlator field in an alert echoes a correlator value of the "Execute" command and other instances are all omitted in

```
<Alert>
    <CmdID>2</CmdID>
    <Data>1226</Data> <!-- Generic Alert -->
    <Correlator>abc123</Correlator>
    <Item>
        <Source><LocURI>./SyncML/Sample</LocURI></Source>
        <Meta>
            <Type xmlns='syncml:metinf'>
                Reversed-Domain-Name: org.domain.samplealert
            </Type>
            <Format xmlns='syncml:metinf'>xml</Format>
            <Mark xmlns='syncml:metinf'>critical</Mark> <!-- Optional --
>   </Meta>
        <Data>
            <!-- Client Alert Data Goes Here -->
        </Data>
    </Item>
</Alert>
```

The above alert message includes elements such as CmdID, Data, Correlator, Item, LocURI, Meta, Type, Format and Mark. The elements will now be described.

CmdID: this is information for identifying the corresponding command. All commands must have this value.

Data: the data element needs to use value 1226 [DMREP-PRO] in order to notify the DM server of the generic alert.

Item: the item element needs to be repeated for each generic alert when a device transmits various types of generic alerts in the same alert message.

LocURI in source: this corresponds to an optional parameter. When an alert is generated from a management object and the management object is defined such that LocURI must be included, LocURI must be included in a generic alert message.

Meta: the meta element needs to be specified for the type and format of alert data.

the alert. The corresponding correlator value needs to be a unique value for each DM client until the DM server receives a response to the "Execute" command, irrespective of the corresponding package or message included in the management session. MO definition needs to specify how the correlator is used through the generic alert.

The generic alert is used in order to notify the server of generation of an MO associated event when the MO associated event is generated in a client. Accordingly, the generic alert is used even for an asynchronization response to the "Execute" command. In addition, the correlator in the generic alert needs to be identical to the correlator in the "Execute" command previously transmitted from the server.

Synchronization Response or Asynchronization Response

Methods for replying to a command from a server through the generic alert include a synchronization response and an asynchronization response. The synchronization response is a method of transmitting a reply to reception of the command and a result of execution of the command to the server as one response and the asynchronization response is a method of transmitting the reply to reception of the command and the result of execution of the command to the server as different responses.

The asynchronization response requires the correlator, as described above.

Execute Command

Purpose: this command is sent to a node, for which the corresponding command is available, in a DM tree in a DM client so as to execute the process of the node.

Parent elements: SyncBody, Atomic, Sequence

Restriction: Nodes for which the "Execute" command is available need to transmit return values with respect to the "Execute" command synchronously. For a long-execution process, for which a return value with respect to a result of execution of the "Execute" command is difficult to transmit synchronously, from among processes of nodes for which the "Execute" command is available, a status code that indicates whether the process has been successfully launched and a local identifier of the "Execute" command need to be returned as the return value.

Essential CmdID element type specifies a unique identifier in a message belonging to a management session with respect to the command.

Option meta element type describes meta information to be used for the command. For example, a common media type or formats for all items can be specified. The range of the meta information is restricted by a command.

One item element must be specified. The item element specifies data to be used as arguments for a process to be performed. The "Execute" command needs to be specified in Sequence or SyncBody element type, and a target specified in the item element in the "Execute" command needs to be total device URIs indicating nodes for which the command can be executed.

How a process associated with a node for which the command can be executed interprets the arguments and how the process returns values conform to description of the node for which the command can be executed, which is a target.

The command returns a valid status code and status codes are as follows.

TABLE 1

| Status code | Meaning |
| --- | --- |
| (200) OK | The command and the associated alert action are completed successfully. |
| (202) Accepted for processing | The request to either run a remote execution of an application or to alert a user or application was successfully received. |
| (215) Not executed | Command was not executed, as a result of: User interaction as user chose to abort or cancel, The parent Atomic command failed, causing this command to fail. |
| (401) Unauthorized | The originator's authentication credentials specify a principal with insufficient rights to complete the command. |
| (403) Forbidden | Forbidden. The command could not be executed for reasons other than access control rights. |
| (405) Command not allowed | The requested command is not allowed on the target. |
| (406) Optional Feature Not Supported | The specified Exec command is not supported by the recipient. |
| (407) Authentication required | No authentication credentials were specified. A suitable challenge can also be returned. |
| (414) URI too long | URI in command is too long. Either string presenting URI or segment in URI is too long or URI has too many segments. |
| (420) Device full | There is insufficient space in the recipient management tree for the data item. |
| (425) Permission denied | The server does not have the proper ACL permissions. |
| (500) Command failed | Non-specific errors created by the recipient while attempting to complete the command. |
| (510) Data store failure | Error occurs while the recipient copying the data item within the recipient's management tree. |

Cred element must not be used in the "Execute" command.

Correlator element must be used when the server expects an asynchronization response to the "Execute" command.

A content model is as follows and an element including "?" may not exist as an option.

(CmdID, NoResp?, Cred?, Meta?, Correlator?, Item)

Example of Execute Command

```
<Exec>
    <CmdID>3</CmdID>
    <Correlator>correlator1</Correlator>
    <Item>
        <Target>
            <LocURI>./SCM/Inventory/Deployed/Component789/Operations/Activate</LocURI>
        </Target></Item>
</Exec>
```

In current DM, a correlator for the "Execute" command may be present. That is, the DM server determines whether the correlator is inserted and transmits the determination result to a client. If the correlator is not present, the client sends a synchronization response to the command unconditionally. The client determines whether to transmit a synchronization response or an asynchronization response when the correlator is present. When the client determines transmission of the synchronization response, the client loads a status in package #3, as shown in the following, and sends package #3. The following example is an example of an SCOMO (Software Component Management Object). According to definition of SCOMO, data element 1200 means that the command completed successfully.

```
<Status>
    <MsgRef>1</MsgRef>
        <CmdRef>3</CmdRef>
        <Cmd>Exec</Cmd>
        <Data>1200</Data>     <!-- SCOMO Result Code -->
        <Item>
            <Source>
                <LocURI>./SCM/Inventory/Deployed/Component789/Operations/Activate</LocURI> </Source></Item>
    </Status>
```

When the DM client determines transmission of the asynchronization response, the DM client loads the status in package #3 and sends package #3 as follows. 202 of the data element means accepted for processing for Exec command.

```
                        <Status>
                        <CmdID>1</CmdID>
                        <MsgRef>1</MsgRef>
                        <CmdRef>3</CmdRef>
                        <Cmd>Exec</Cmd>
                        <Data>202</Data>
                        </Status>
```

Upon completion of execution of Exec command, the client transmits the execution result through a generic alert.

```
<Alert>
    <CmdID>2</CmdID>
    <Data>1226</Data>     <!-- Generic Alert -->
    <Correlator>correlator1</Correlator>
<Item><Source><LocURI>./SCM/Inventory/Deployed/Component789/Operations/Activate</LocURI></Source>
    <Meta>
        <Type xmlns="syncml:metinf">
        urn:oma:at:scomo:1.0:OperationComplete
    </Type>
        <Format xmlns="syncml:metinf">xml</Format>
        <Mark xmlns="syncml:metinf">warning</Mark>
    </Meta>
    <Data>
        <![CDATA[<ResultCode>1200</ResultCode> <!-- SCOMO Result Code -->
        <Identifier>Component1ID</Identifier>]]>
    </Data>
    </Item>
</Alert>
```

The following table shows result code elements of an exemplary generic alert of the SCOMO.

TABLE 2

| Result Code | Result Message | Informative Description of Status Code Usage |
|---|---|---|
| 1200 | Successful | Successful- The request has succeeded |
| 1250-1299 | Successful - Vendor Specified | Successful operation with vendor specified result |
| 1400 | Client Error | Client error - based on user or device behavior |

TABLE 2-continued

| Result Code | Result Message | Informative Description of Status Code Usage |
|---|---|---|
| 1401 | User cancelled | User chose not to accept the operation when prompted. |
| 1402 | Download Failed | The software component download failed. |
| 1403 | Alternate Download Authentication Failure | Authentication was required but authentication failure was encountered when downloading software component. |
| 1404 | Download failed due to Device is out of memory | The download failed due to insufficient memory in the device to save the delivery package. |
| 1405 | Install Failed | Software component installation failed in the device. |
| 1406 | Install failed due to Device out of memory | The install failed because there was not sufficient memory to install the software component in the device. |
| 1407 | Failed package validation | Failure to positively validate digital signature of the delivery package. |
| 1408 | Remove failed | The software component removal operation failed. |
| 1409 | Activate failed | The software component activation operation failed. |
| 1410 | Deactivate failed | The software component deactivation operation failed. |
| 1411 | Not Implemented | The device does not support the requested operation. |
| 1412 | Undefined Error | Indicates failure not defined by any other error code. |
| 1413 | Operation rejected - unsupported environment | The operation has been rejected because the device does not support the target environment type. |
| 1450-1499 | Client Error - Vendor Specified | Client error encountered for operation with vendor specified result code. |
| 1500 | Alternate Download Server Error | Alternate download server error encountered. |
| 1501 | Alternate Download Server Unavailable | The alternate download server is unavailable or does not respond. |
| 1550-1599 | Alternate Download Server Error - Vendor Specified | Alternate download server error encountered for operation with vendor specified result code. |

The aforementioned conventional asynchronization response through a generic alert has some problems. For example, it is desirable that the DM server transmitting a command stably receive a response to the command from a client (terminal). However, the DM client can select a synchronization or asynchronization response and thus the DM server cannot predict when the response to the command is received. Accordingly, the DM server cannot immediately transmit a command necessary for the DM client to determine a synchronization response for a command that takes a long time to be executed since the DM server cannot transmit a new package when a reply is not received from the DM client.

Further, while the server generates and transmits a command, the client executes the command. Accordingly, the server cannot predict how long it will take to execute the command, and thus the server transmits the correlator along with the command (or includes the correlator in the command and transmits the command including the correlator). However, correlator generation and transmission loads are generated when the correlator is generated and transmitted for all commands.

The present invention provides specific standards for selecting synchronization/asynchronization response modes. More specifically, the present invention proposes use of a duration indicated by a timeout as a standard of selecting the synchronization/asynchronization response mode.

According to one embodiment of the present invention, the server can transmit a timeout parameter for determining or selecting the synchronization/asynchronization response mode along with a command when sending the command to a terminal (or client).

According to another embodiment of the present invention, the server and the terminal can previously share the timeout. In the specification, the shared timeout is referred to as a default timeout.

According to another embodiment of the present invention, when the server transmits a command to the terminal without a specific or explicit timeout, the terminal can recognize that the synchronization/asynchronization response mode needs to be determined using the default timeout.

According to another embodiment of the present invention, when the timeout parameter transmitted from the server is a specific value (e.g. an arbitrary negative integer), the terminal can recognize that the synchronization/asynchronization response mode needs to be determined using the default timeout.

Figure 3:
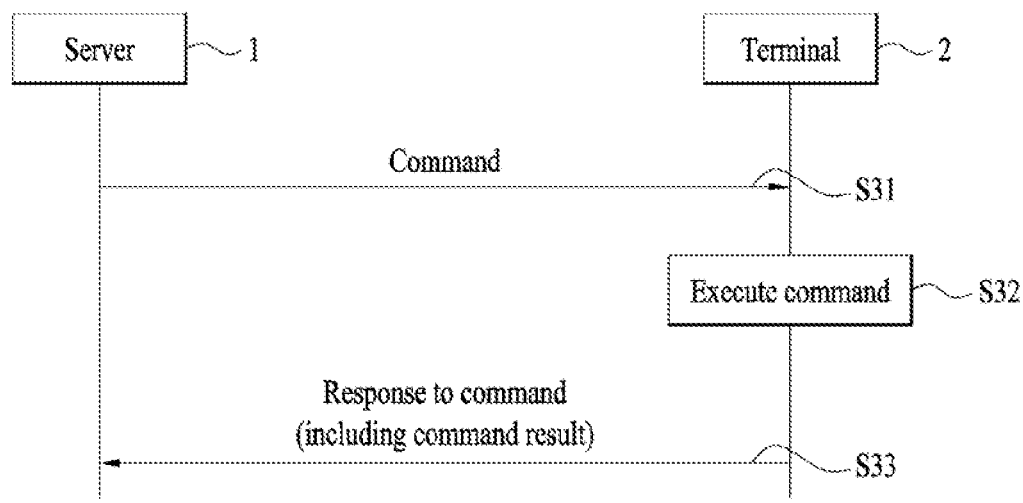
FIG. 3 illustrates a procedure for transmitting a command and replying to the command according to an embodiment of the present invention.
Figure 4:
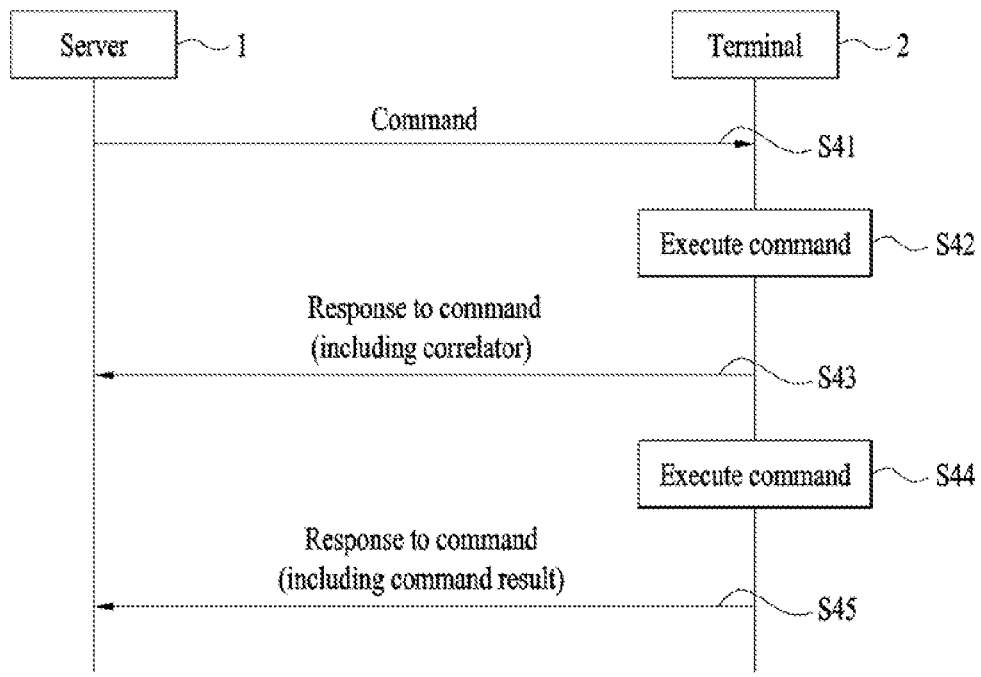
FIG. 4 illustrates a procedure for transmitting a command and replying to the command according to an embodiment of the present invention.

FIGS. 2, 3 and 4 illustrate transmission of a command by a server and a response of a terminal to the command according to embodiments of the present invention.

FIG. 2 illustrates an example in which the asynchronization response mode is not allowed. In this case, the terminal needs to reply to the command of the server through the synchronization response mode only. The server 1 can transmit a command to the terminal 2 (S21). The terminal can execute the command (S22) and transmit a command response including a result of execution of the command to the server (S23). In this case, if a long time is taken to execute the command, then a long time is required for the server to receive the response to the command from the terminal and thus the server must wait for the response from the terminal without transmitting any other commands to the terminal.

FIGS. 3 and 4 illustrate cases in which the asynchronization/synchronization response modes are allowed and the parameter for determining the asynchronization/synchronization response modes, that is, the aforementioned timeout parameter is not explicitly transmitted from the server to the terminal. In this case, the server 1 and the terminal 2 can determine the asynchronization/synchronization response modes using the predetermined default timeout. FIG. 3 illustrates a case in which the terminal completes execution of a command from the server within a time indicated by the default timeout and FIG. 4 illustrates a case in which the terminal does not complete execution of the command within the time.

Referring to FIG. 3, the server 1 can transmit the command to the terminal 2 (S31). Upon reception of the command, the terminal can confirm that the explicit timeout parameter has not been received along with the command, and thus the terminal can confirm that the time indicated by the default timeout is a standard for determining the synchronization/asynchronization response modes. Then, the terminal can execute the command (S32). When execution of the command is completed within the time indicated by the default timeout, the terminal can transmit a command response including a result of execution of the command to the server (S33).

Referring to FIGS. 4, S41 and S42 correspond to S31 and S32 of FIG. 3 and thus description thereof is omitted to avoid redundant description. The terminal can execute the command and, simultaneously, operate a timer. The timer is used to determine whether the time indicated by the default timeout expires. When execution of the command is not completed even though the time indicated by the default timeout has expired, the terminal can transmit a command response including a correlator to the server (S43). The correlator can be generated by the terminal.

The command response transmitted in step S43 can serve as an acknowledgement response. As described above, when the server does not receive any response from the terminal, the server cannot transmit a new command to the terminal and thus data processing efficiency of the server and the terminal is deteriorated. Accordingly, when execution of the command is not completed even after expiration of the time indicated by the default timeout, the terminal preferably transmits the command response including the correlator to the server.

Subsequently, the terminal can continuously execute the command (S44). Upon completion of execution of the command, the terminal can send a command response including the correlator and a result of execution of the command to the server (S45).

While the server does not transmit the timeout parameter to the terminal in the examples of FIGS. 2, 3 and 4, the server may explicitly transmit the timeout parameter to the terminal when sending the command to the terminal in an embodiment of the present invention.

In the above-described examples of FIGS. 2, 3 and 4, the server does not transmit the correlator along with the command to the terminal. However, the server may transmit the correlator along with the command. Description will be given of embodiments of the present invention according to whether the correlator is transmitted along with the command to the terminal.

First Embodiment: Case in which a Correlator is not Received from the Server

The first embodiment corresponds to the examples described with reference to FIGS. 2, 3 and 4. In this case, the terminal can generate the correlator, include the correlator in the response to the command and transmit the response to the server, as described above with reference to FIG. 4. A description will be given of a case in which a command from the server is a package corresponding to a set of commands, instead of a single command.

Figure 5:
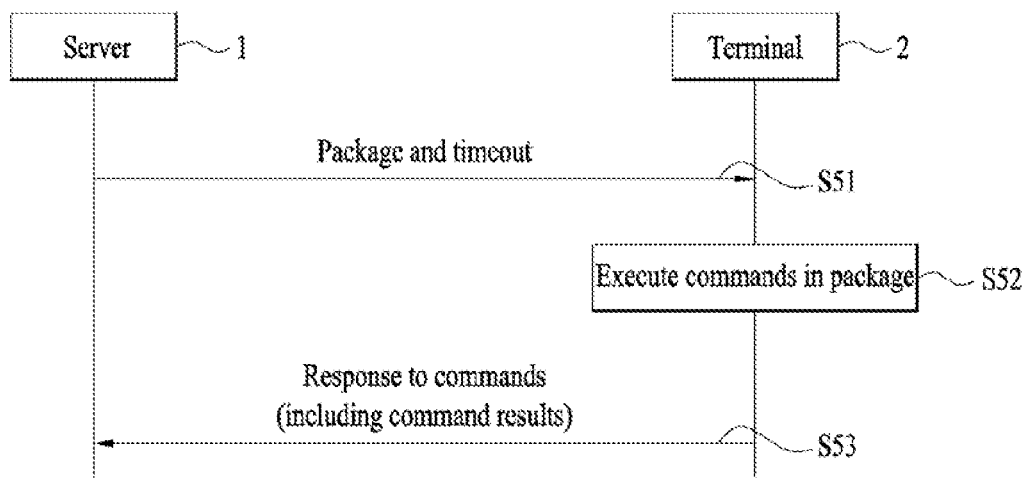
FIG. 5 illustrates a procedure for transmitting a command and replying to the command according to an embodiment of the present invention.

Separate descriptions will be given of a case in which execution of all commands in the package is completed within the time indicated by the timeout and a case in which execution of all commands in the package is not completed within the time when the package is transmitted from the server to the terminal. FIG. 5 illustrates the case in which execution of all commands in the package is completed within the time indicated by the timeout and FIG. 6 illustrates the case in which execution of all commands in the package is not completed within the time.

The server 1 can transmit the package and the timeout parameter to the terminal 2 (S51). The terminal can execute commands in the package (S52). The terminal can initiate the timer selectively or additionally. The timer can be used to determine whether the time indicated by the timeout has expired. Since the time indicated by the timeout has not expired although execution of the commands is completed, the terminal can send a command response including a result of execution of the commands to the server (S53).

Figure 6:
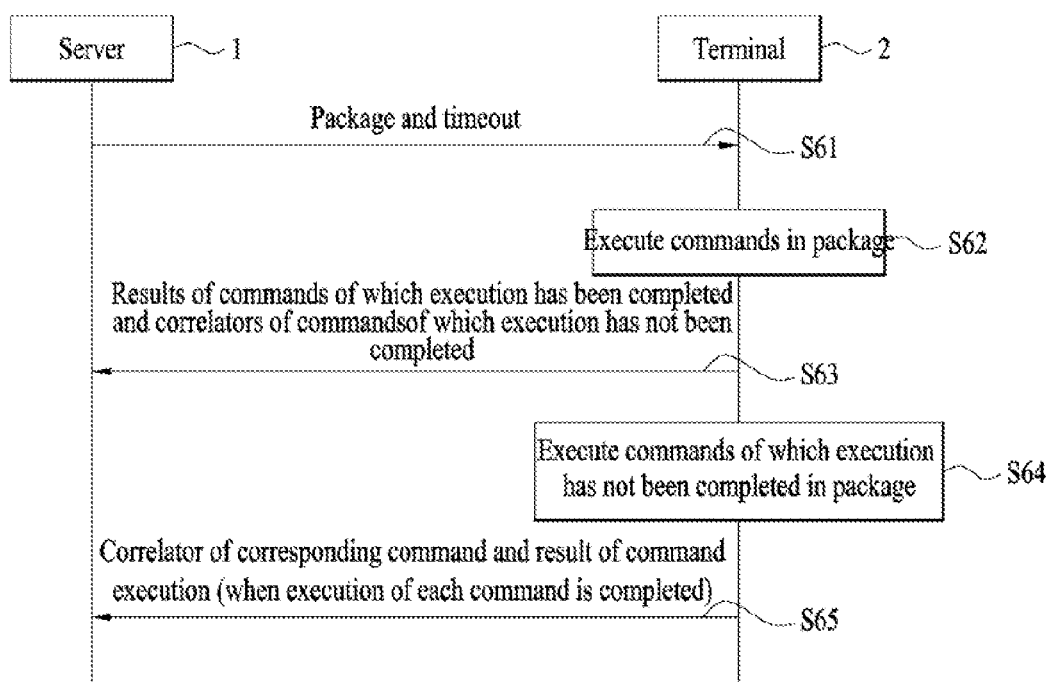
FIG. 6 illustrates a procedure for transmitting a command and replying to the command according to an embodiment of the present invention.

Referring to FIGS. 6, S61 and S62 correspond to S51 and S52 of FIG. 5 and thus description thereof is omitted to avoid redundant description. FIG. 6 illustrates an example in which execution of part of the commands in the package is completed and execution of the remaining commands is not completed although the time indicated by the timeout has expired. In this case, the terminal can generate correlators respectively for commands of which execution has not been completed and transmit results of commands of which execution has been completed and the correlators to the server when the time indicated by the timeout expires (S63). The correlators are retransmitted to the server when results of the commands of which execution has not been completed are sent to the server such that the server can recognize the results of the corresponding commands.

The terminal can execute the commands of which execution has not been completed (simply referred to as "remaining commands" hereinafter) (S64). The terminal can transmit results of commands of which execution has been completed from among the remaining commands and correlators respectively for the commands to the server (S65). The results of the commands and the correlators therefor can be transmitted through a message belonging to one management session, messages belonging to several management sessions or messages belonging to different management sessions.

That is, in the embodiment illustrated in FIG. 6, the terminal can transmit, to the server, a synchronization responses to commands, which have been executed within the time indicated by the timeout, from among the commands in the package and an asynchronization response to commands which have not been executed within the time indicated by the timeout.

Second Embodiment: Case in which a Correlator is Received from the Server

The server can designate a correlator for each command and transmit the correlator to the terminal. Accordingly, the terminal can include the correlator in asynchronization responses to commands, which have not been executed within the time indicated by the timeout parameter transmitted along with commands, and transmit the asynchronization responses to the server. The terminal does not transmit the correlator as a response to commands that have been executed within the time indicated by the timeout parameter.

is received from the server, the terminal can use time information designated by the timeout parameter, as described above.

Determination of a timeout or a response mode to be used may depend on system configuration. More specifically, there may be the following two typical cases.

TABLE 3

| Command reception type | Set value: Type A | Set value: Type B |
|---|---|---|
| Only command (without timeout) | Type A is designed to apply the default timeout when the server does not explicitly transmit the timeout parameter. Since the explicit timeout is not present, a time indicated by the default timeout pre-defined between the terminal and the server is used to determine the response mode, a result value can be transmitted through a synchronization response when command execution is completed within the time, and the result value can be transmitted through an asynchronization response when command execution is not completed within the time. | Type B is designed to forbid asynchronization response when the server does not explicitly transmit the timeout parameter. Accordingly, a command can be executed and a result of execution of the command can be transmitted to the server through a synchronization response. |
| Command + timeout | The time indicated by the specified timeout is used to determine the response mode, a result value can be transmitted through a synchronization response when command execution is completed within the time, and the result value can be transmitted through an asynchronization response when command execution is not completed within the time. | The time indicated by the specified timeout is used to determine the response mode, a result value can be transmitted through a synchronization response when command execution is completed within the time, and the result value can be transmitted through an asynchronization response when command execution is not completed within the time. |
| Command + timeout, but timeout value = reserved value | Type A is designed to forbid asynchronization response when the timeout parameter transmitted by the server is a reserved value (i.e. specific value). Accordingly, a command can be executed and a result of execution of the command can be transmitted to the server through a synchronization response. | Type B is designed to apply the default timeout when the timeout parameter transmitted by the server is a reserved value (i.e. specific value). Accordingly, a time indicated by the default timeout pre-defined between the terminal and the server is used to determine the response mode, a result value can be transmitted through a synchronization response when command execution is completed within the time, and the result value can be transmitted through an asynchronization response when command execution is not completed within the time. |

Figure 7:
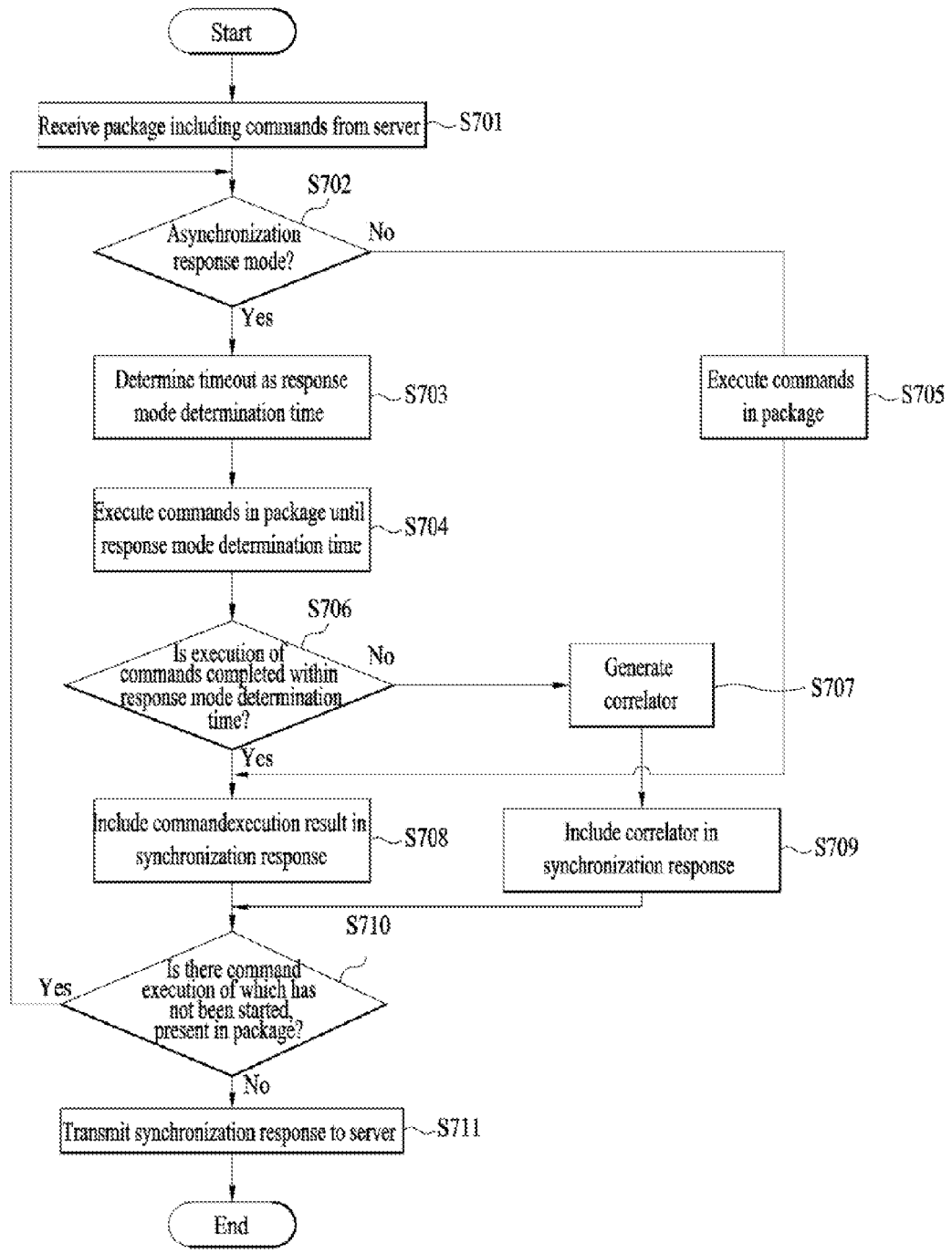
FIG. 7 is a flowchart illustrating a procedure for transmitting a command and replying to the command according to an embodiment of the present invention.

FIG. 7 is a flowchart illustrating the aforementioned embodiments of the present invention in more detail.

S701: The terminal can receive a package including one or more commands from the server. The package is a set of one or more commands. Here, it is assumed that the package may include one command.

S702: The terminal can determine whether to reply to the command in the synchronization response mode or the asynchronization response mode. More specifically, the terminal can determine whether the asynchronization response mode is allowed for a response to the command.

When the asynchronization response mode is allowed, the terminal can determine a timeout to be used to determine the asynchronization response mode or the synchronization response mode. That is, when the explicit timeout parameter S703: The terminal can determine a timeout to be used as a time (i.e. determination time) for determining a response mode, as described above. According to the above embodiment, the terminal can use the default timeout or the timeout received from the server to determine the response mode.

If a plurality of commands is included in the package, timeout may be individually set per command.

S704: The terminal can execute the commands in the package until the determination time expires. The terminal can sequentially execute the commands in the package. Accordingly, the terminal can execute one command and then execute the next command upon completion of execution of the command during the determination time.

S705: The terminal can execute the commands in the package when the asynchronization response mode is not allowed. When the server wants to acquire a result of a command through synchronization response unconditionally, that is, when the response mode is set such that asynchronization response is not used, the terminal can continuously execute the commands in the package until execution of all commands is completed.

S706: The terminal can determine whether corresponding commands have been executed within the determination time.

S707: When execution of the corresponding commands have not been completed within the determination time, that is, when there is a command of which execution has not been completed, the terminal can generate a correlator for the command.

When the terminal transmits a result of execution of the commands of which execution has not been completed to the server through an asynchronization response, the correlator is used for the server to recognize a command corresponding to the execution result received from the terminal. In the case of synchronization response, the server can recognize a command corresponding to a command execution result, which is received from the terminal, through a command identifier or sequential response in a session. In the case of asynchronization response, however, a session in which a command is transmitted may be ended and, even if the session is maintained, the server cannot recognize a command corresponding to a command execution result received from the terminal in the case of sequential response. Accordingly, a correlator is included in a synchronization response and the same correlator is included in an asynchronization response later such that the server can recognize a command corresponding to the asynchronization response. Therefore, the correlator may be a unique value of each terminal (client), which is valid between synchronization response transmission time and asynchronization response transmission time (or between synchronization response reception time and asynchronization response reception time at the server).

S708: When execution of the corresponding commands has been completed within the determination time, the terminal can include results of execution of the commands in a synchronization response.

S709: When execution of the corresponding commands has not been completed within the determination time, the terminal can include the correlator in the synchronization response including command execution results with respect to commands of which execution has been completed.

Even if it is determined that a command execution result is transmitted through an asynchronization response, the terminal needs to notify the server that the asynchronization response is transmitted since command execution is not completed within the timeout, through a synchronization response. The synchronization response needs to include the correlator and can notify the server that commands are being executed.

S710: The terminal can determine whether a command, execution of which has not been started (initiated), is present in the package received in S701.

While the timeout parameter can be set per package (i.e. package-level), as described above, the timeout parameter may be set per command in the package (i.e. command-level). When the timeout parameter is set per command in the package, the aforementioned steps S702 to S709 can be performed per command in the package. That is, the time for determining a response mode is determined by the timeout parameter set per command, and whether execution of a corresponding command has been completed within the time (simply referred to as "determination time" hereinafter) corresponding to each timeout parameter can be determined. When execution of a specific command has been completed within a determination time for the specific command, a result of execution of the specific command is accumulated in a synchronization response. When execution of the specific command has not been completed within the determination time for the specific command, a response (e.g. correlator) with respect to the command of which execution has not been completed can be included in the synchronization response.

When a command that has not been started to execute is not present in the package, the terminal transmits a synchronization response to the plurality of commands and the correlator included in the synchronization response to the server as one response in S711.

When a command, execution of which has not been started, is present in the package, the terminal returns to S702 and repeats S702 to S709.

The terminal can continuously execute commands of which execution has not been completed and transmit results of execution of the commands to the server through asynchronization responses.

Figure 8:
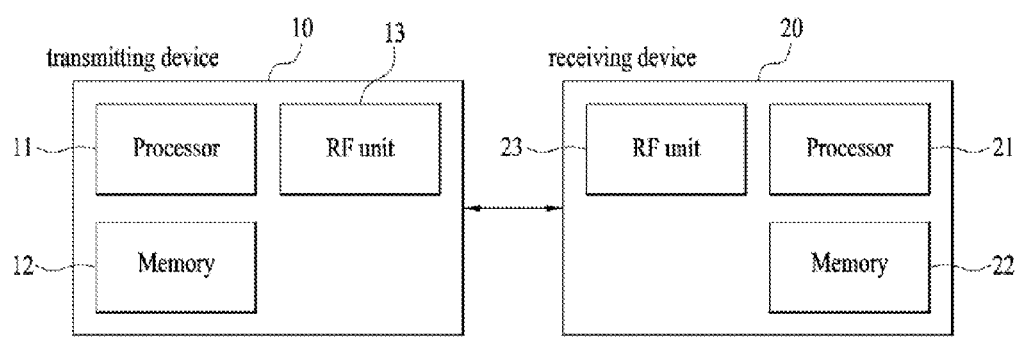
FIG. 8 is a block diagram of an apparatus for implementing embodiments of the present invention.

FIG. 8 is a block diagram of an apparatus configured to implement the embodiments of the present invention. A transmitter 10 and a receiver 20 include radio frequency (RF) units 13 and 23 capable of transmitting or receiving radio signals carrying information and/or data, signals, messages and the like, memories 12 and 22 storing various types of information associated with communication in a wireless communication system, and processors 11 and 21 operatively connected to components such as the RF units 13 and 23 and the memories 12 and 22 and configured to control the memories 12 and 22 and/or the RF units 13 and 23 to perform at least one of the embodiments of the present invention, respectively.

The memories 12 and 22 may store programs for processing and control of the processors 11 and 21 and temporarily store input/output information. The memories 12 and 22 may be used as buffers.

The processors 11 and 21 control overall operations of modules of the transmitter or the receiver. Particularly, the processors 11 and 21 can execute various control functions for implementing the present invention. The processors 11 and 21 may be called controllers, microcontrollers, microprocessors, microcomputers and the like. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), field programmable gate arrays (FPGAs) or the like, which are configured to implement the present invention, may be included in the processors 11 and 21. In a firmware or software configuration, embodiments of the present invention may be implemented in the form of a module, a procedure, a function, etc. Firmware or software configured to implement the present invention may be included in the processors 11 and 21 or stored in the memories 12 and 22 and executed by the processors 11 and 21.

In the embodiments of the present invention, the terminal or device and the server, or DMC and DMS may operate as the transmitter 10 or the receiver 20.

The terminal or device and the server, or DMC and DMS as the receiver or transmitter may be implemented such that the embodiments of the present invention, which have been described with reference to the drawings, are independently applied or two or more thereof are simultaneously applied.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention can be used for terminals, base stations, servers or other apparatuses of wireless communication systems.

The invention claimed is:

1. A method for transmitting, by a terminal, a response to a command from a server in a wireless communication system, the method comprising:
   receiving a command from the server;
   executing the command until a timeout expires;
   transmitting, to the server, a first response including an identifier for the command when the execution of the command has not been completed before the timeout expires; and
   continuing to execute the command and transmitting a second response including a result of the execution of the command and the identifier after completion of the execution of the command.

2. The method according to claim 1, wherein the timeout is a predetermined value or a value transmitted from the server.

3. The method according to claim 1, wherein the timeout is determined as a predetermined value when the timeout is not explicitly received from the server.

4. The method according to claim 1, wherein the timeout is determined as a predetermined value when a timeout having a specific value is explicitly received from the server.

5. The method according to claim 1, further comprising generating the identifier for the command.

6. The method according to claim 1, wherein the identifier for the command is a value valid between a time when the first response is transmitted and a time when the second response is transmitted.

7. A method for transmitting, by a terminal, a response to a command from a server in a wireless communication system, the method comprising:
   receiving a command package including a plurality of commands from the server;
   sequentially executing the commands in the command package until a timeout expires;
   transmitting, to the server, a first response including results of an execution of commands of which execution has been completed, from among the commands in the command package, and identifiers for remaining commands of which the execution has not been completed before the expiration of the timeout; and
   continuing to execute the remaining commands and transmitting a second response including results of the execution of the remaining commands and the identifiers for the remaining commands after completion of the execution of the remaining commands.

8. The method according to claim 7, wherein the timeout is a predetermined value or a value transmitted from the server.

9. The method according to claim 7, wherein the timeout is determined as a predetermined value when the timeout is not explicitly received from the server.

10. The method according to claim 7, wherein the timeout is determined as a predetermined value when a timeout having a specific value is explicitly received from the server.

11. The method according to claim 7, further comprising generating the identifiers for the commands.

12. The method according to claim 7, wherein the identifiers are values valid between a time when the first response is transmitted and a time when the second response is transmitted.

13. A method for transmitting, by a terminal, a response to a command from a server in a wireless communication system, the method comprising:
   receiving a command package including a plurality of commands from the server;
   sequentially executing the commands in the command package until a timeout expires, including results of commands of which execution has been completed before the expiration of the timeout in a first response, and including identifiers for remaining commands of which execution has not been completed before expiration of the timeout in the first response;
   transmitting the first response to the server when a command to be initiated to execute is not present in the command package; and
   continuing to execute the remaining commands and transmitting a second response including results of the execution of the remaining commands and the identifiers for the remaining commands after completion of the execution of the remaining commands.

14. A terminal configured to transmit a response to a command from a server in a wireless communication system, the terminal comprising:
   a radio frequency (RF) unit; and
   a processor configured to:
      control the RF unit,
   wherein the processor is configured to:
      receive a command from the server,
      execute the command until a timeout expires,
      transmit, to the server, a first response including an identifier for the command when the execution of the command has not been completed before the timeout expires, and
      continue to execute the command and transmit a second response including a result of the execution of the command and the identifier after completion of the execution of the command.

* * * * *